US012811953B2

(12) United States Patent
Kaidi

(10) Patent No.: US 12,811,953 B2
(45) Date of Patent: Nov. 24, 2026

(54) SYSTEMS AND METHODS FOR MULTI-LEVEL FINGERPRINTING

(71) Applicant: PAYPAL, INC., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 125 days.

(21) Appl. No.: 18/501,857

(22) Filed: Nov. 3, 2023

(65) Prior Publication Data

US 2025/0150463 A1 May 8, 2025

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 7,810,155 B1 * | 10/2010 | Ravi | H04L 63/1416 | 726/22 |
| 7,954,158 B2 * | 5/2011 | Denton | G06F 21/566 | 726/25 |
| 8,418,249 B1 * | 4/2013 | Nucci | G06F 21/552 | 709/225 |
| 9,614,773 B1 * | 4/2017 | Tagore | H04L 47/2441 | |
| 10,313,379 B1 * | 6/2019 | Han | G06N 5/04 | |
| 10,332,005 B1 * | 6/2019 | Liao | H04L 47/2441 | |
| 10,341,377 B1 * | 7/2019 | Dell'Amico | H04L 63/1416 | |
| 11,582,251 B2 * | 2/2023 | Chen Kaidi | G06N 5/04 | |
| 2004/0250124 A1 * | 12/2004 | Chesla | G06F 21/552 | 709/224 |
| 2013/0347103 A1 * | 12/2013 | Veteikis | H04L 43/04 | 726/22 |
| 2016/0088001 A1 * | 3/2016 | Yeh | H04L 63/20 | 726/23 |
| 2017/0142136 A1 * | 5/2017 | Yi | G06F 16/22 | |
| 2017/0289180 A1 * | 10/2017 | Zheng | H04L 63/1416 | |
| 2018/0212997 A1 * | 7/2018 | Ahuja | H04L 63/1416 | |
| 2018/0332060 A1 * | 11/2018 | Johnson | H04L 63/0236 | |
| 2019/0075123 A1 * | 3/2019 | Smith | G06N 3/006 | |
| 2019/0182274 A1 * | 6/2019 | Doron | H04L 63/1416 | |
| 2020/0019821 A1 * | 1/2020 | Baracaldo-Angel | G06F 18/10 | |
| 2020/0036684 A1 * | 1/2020 | Thompson | H04L 63/1416 | |
| 2021/0377288 A1 * | 12/2021 | Chen Kaidi | H04L 63/1416 | |
| 2022/0058660 A1 * | 2/2022 | Ivanov | G06F 21/554 | |
| 2023/0069731 A1 * | 3/2023 | Chen | H04L 63/0263 | |
| 2023/0087309 A1 * | 3/2023 | Pietila | H04L 63/1425 | 726/23 |

(Continued)

*Primary Examiner* — Michael Pyzocha

(74) *Attorney, Agent, or Firm* — Greenberg Traurig, LLP

(57) ABSTRACT

A computer-implemented method may include receiving a set of security signatures for analysis; correlating the set of security signatures with corresponding computing traffic data within which the set of security signatures have appeared; extracting from the computing traffic data a set of features describing the computing traffic data; correlating the set of features with the set of security signatures; and generating a new security signature based at least in part on a correlation between the set of features and the set of security signatures. Various other methods and systems are also disclosed.

19 Claims, 7 Drawing Sheets

(56) References Cited

U.S. PATENT DOCUMENTS

| | | | | |
|---|---|---|---|---|
| 2023/0138013 | A1* | 5/2023 | Chen | G06F 21/53<br>726/23 |
| 2023/0388321 | A1* | 11/2023 | Berko | H04L 63/1433 |
| 2024/0086539 | A1* | 3/2024 | Ball, Sr. | G06F 21/552 |
| 2024/0250974 | A1* | 7/2024 | Chemiakin | H04L 43/04 |
| 2024/0333768 | A1* | 10/2024 | Shahrivar | H04L 63/20 |
| 2025/0088521 | A1* | 3/2025 | Rahman | H04L 63/1441 |
| 2026/0142985 | A1* | 5/2026 | Jiang | H04L 63/1416 |

* cited by examiner

SYSTEMS AND METHODS FOR MULTI-LEVEL FINGERPRINTING

BACKGROUND

Detecting computing security threats is a critical task in both enterprise and consumer computing environments. However, identifying threats can be difficult, as attackers may modify various parameters of an attack, meaning that a computing security system may recognize one attack as a threat but may not recognize a variation on the attack as a threat.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
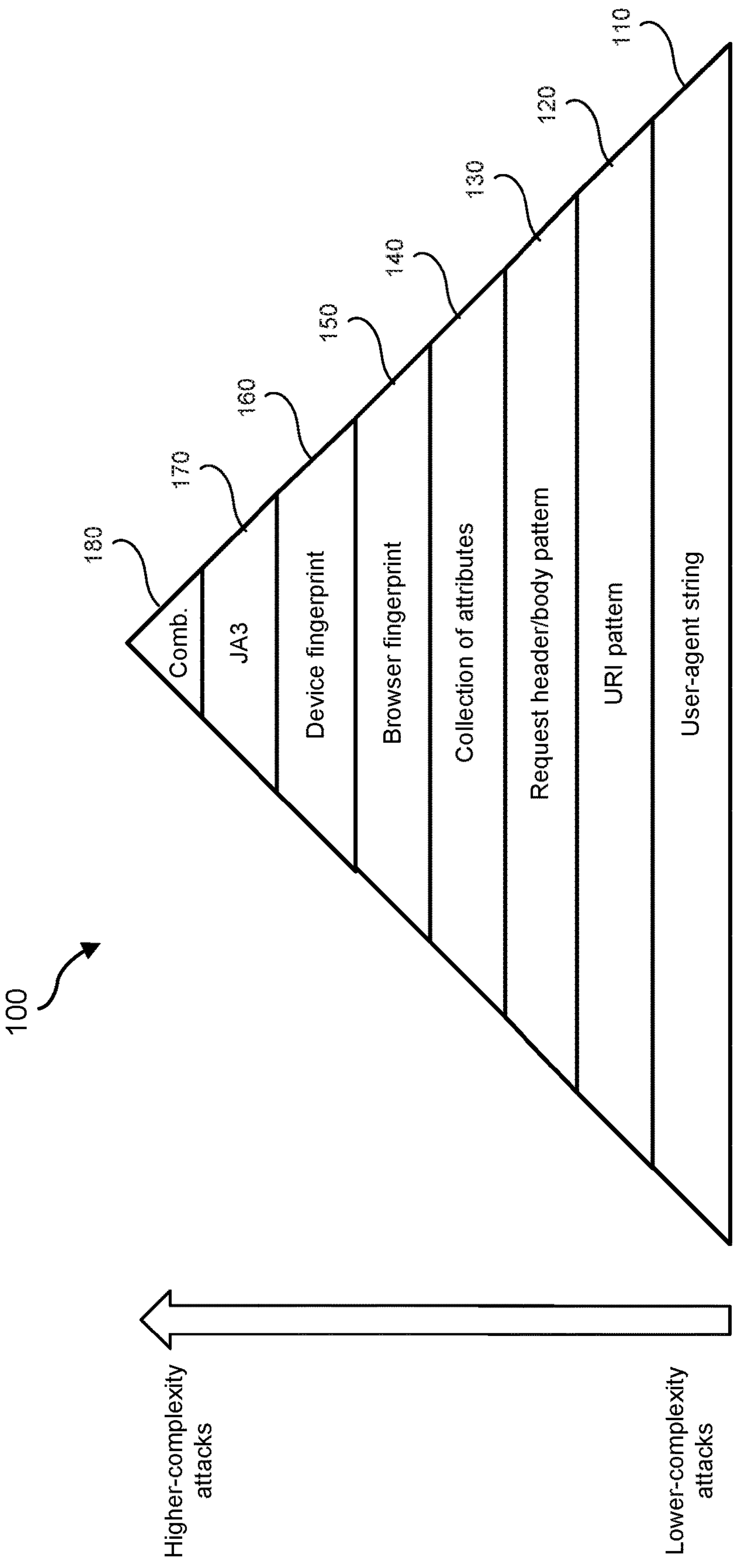
FIG. 1 is an illustration of example relationship between complexity of attacks and sources of signatures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for multi-level fingerprinting. Computing security systems may use known signatures (e.g., hashes or strings for static files and/or fingerprints for network traffic) to identify computing security threats. Some approaches to threat detection may suffer from various limitations, including the ease with which attackers may vary features of their attacks to avoid producing a known signature. This may result in attackers launching successful attacks with relatively little effort and defenders detecting and stopping variants of an attack with considerable effort and, potentially, only after an attack variant has succeeded. Furthermore, by creating a new signature to block a trivial variant of an attack, security analysts may lose visibility into the underlying attack after an attacker varies one or more indicators of the attack.

The systems and methods described herein may provide multi-level fingerprinting. Thus, for example, these systems and methods may leverage signature detection to create additional and/or improved signatures and/or fingerprints by grouping and/or correlating signatures with computing system activity (e.g., network traffic) to identify underlying anomalies in the traffic and then identifying and creating fingerprints for underlying anomalies that may indicate the corresponding threat independent of the signatures.

In some examples, these systems and methods may generate a new security signature based on network traffic data associated with one or more known malicious signatures. For example, these systems and methods may collect instances of known malicious signatures being detected by a security system within a computing environment. Furthermore, these systems and methods may collect network traffic data associated with the detection of the known malicious signatures (e.g., network traffic data that gave rise to the known malicious signatures, and/or network traffic data observed when the known malicious signatures were detected). These systems and methods may then perform an analysis (e.g., a statistical analysis and/or an unsupervised machine learning classification) of the network traffic data associated with the known malicious signatures to identify patterns in the network traffic data that correlate with the known malicious signatures. In some examples, these systems and methods may iteratively search for patterns by enriching the network traffic data with additional associated data (e.g., from one or more secondary log sources). In addition, in some examples, these systems and methods may simulate network traffic using a fuzzing process to produce additional network traffic data.

Once the systems and methods described herein have identified one or more patterns in the network traffic data that correlate with the known malicious signatures, these systems and methods may generate a new signature directed toward one or more of the patterns. These systems and methods may then deploy the new signature for use by a security system in place of and/or in tandem with the corresponding known malicious signatures.

Because the new signature may identify an attack based on the patterns of the attack itself rather than, e.g., on arbitrary parameters sometimes used but easily modified by an attacker, by deploying the new signature for comparison against future network traffic, these systems and methods may detect more instances of an ongoing attack than would be achieved by relying on the original known malicious signatures. Moreover, the new signature may successfully future instances of an attack involving network traffic features with previously unseen parameters. For example, an attacker may vary one or more parameters that would not match any of the previously known malicious signatures that derived from those parameters. Nevertheless, the systems and methods described herein may leverage the new signature to detect an attack with a novel variation of parameters.

In some examples, the systems and methods described herein may generate a new security signature based on network traffic data associated with one or more unknown signatures (i.e., signatures that are not known to indicate malicious activity). For example, these systems and methods may collect instances of unknown signatures being detected by a security system within a computing environment. Furthermore, these systems and methods may collect network traffic data associated with the detection of the unknown signatures (e.g., network traffic data that gave rise to the known malicious signatures, and/or network traffic data observed when the known malicious signatures were detected). These systems and methods may then perform an analysis (e.g., a statistical analysis and/or an unsupervised machine learning classification) of the network traffic data to detect one or more anomalous patterns. These systems and methods may then flag a subset of the unknown signatures as potentially malicious based at least in part on detected anomalous patterns associated with the subset of unknown signatures.

Furthermore, in some examples, the systems and methods described herein may filter out some of the network traffic from the analysis for anomalous patterns. For example, in some cases an attacker may include false-flag actions to deceive security systems and/or distract security analysts. These systems may therefore identify network traffic indicative of false-flag actions—for instance, injecting benign and/or trusted Internet addresses and/or domains in command-and-control callback actions that ordinarily might use malicious Internet addresses and/or domains to perform an exploit.

Once the systems and methods described herein have identified one or more unknown signatures (and/or one or more anomalous patterns connected with the unknown signatures) as related to an attack, these systems and methods may update a security system regarding one or more signatures. For example, these systems and methods may update the security system to classify the unknown signatures as malicious signatures. Additionally or alternatively, these systems and methods may generate a new signature based on one or more anomalous patterns connected with the unknown signatures and update the security system to detect threats based on the new signature. In some examples, these systems and methods may prepare an alert and/or a notification (e.g., directed to one or more security analysts) that indicates one or more targets of one or more attacks associated with the unknown signatures.

The systems and methods described herein may improve the functioning of a computer itself by improving the computing security threat detection and remediation capabilities of the computer. In addition, these systems and methods may improve the functioning of a computer by improving the security of the computer against attacks and unauthorized operations. Furthermore, these systems and methods may represent an improvement to the technical field of computing security.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is an illustration of example relationship between complexity of attacks and sources of signatures. As shown in FIG. 1, a pyramid 100 illustrates different sources of signatures as corresponding to attacks with different levels of complexity, where levels toward the base of pyramid 100 represent lower-complexity attacks while levels toward the top of pyramid 100 represent higher-complexity attacks. As used here, the term "complexity" as it relates to computing attacks may refer to any of a number of characteristics of attacks. In one example, the term "complexity" may refer to the difficulty of performing the attack (e.g., in terms of the resources required to perform the attack, the number of steps and/or amount of resources required to create a variant of the attack that would be tagged with a different signature by a security system, and/or the amount of resources required to detect the attack). In some examples, the term "complexity" may refer a predetermined metric, such as the Common Vulnerability Scoring System (CVSS). In certain examples, the term "complexity" may refer the degree to which an attack depends on conditions outside of an attacker's control. In some examples, the term "complexity" may refer to a predefined ranking (such as that illustrated in FIG. 1).

The term "signature," as used herein, generally refers to any summary of one or more features of an instance of computing activity. In some examples, the systems and methods described herein may extract a signature from network traffic by, e.g., extracting one or more fields, attributes, and/or parameters from the network traffic. In some examples, a signature may be codified into a unique string and/or value, such as a hash. In various examples, a security system may track signatures and classify them (e.g., as malicious, benign, unknown, etc.) and take different actions based on the classification of observed signatures (e.g., blocking activity relating to a malicious signature).

By way of example, a signature may be generated from a user-agent string 110. Systems and methods described herein may generate a signature from user-agent string 110 by generating a hash of user-agent string 110. Additionally or alternatively, these systems and methods may generate the signature from user-agent string 110 based on a defined portion of user-agent string 110. For example, these systems and methods may extract user-agent string 110 from a Hypertext Transfer Protocol (HTTP) header when receiving an HTTP request from a client system.

As another example, a signature may be generated from a Uniform Resource Identifier (URI) pattern 120. Systems and methods described herein may generate a signature from URI pattern 120 by generating a hash of one or more portions and/or features of a URI (e.g., a URI that is requested by a client and/or otherwise identified in the payload of a client communication). In some examples, these systems and methods may generate a signature based at least in part on one or more query parameters within a URI and/or one or more portions of a directory path of a URI.

In another example, a signature may be generated based on a request header and/or a request body pattern, such as a request header/body pattern 130. For example, these systems and methods may generate a signature based on a host header, a content-type header (e.g., in conjunction with a type of actual content being sent), and/or an input validation pattern (e.g., a string potentially indicating an attempt at an injection attack and/or cross-site scripting).

In some examples, a signature may be generated based on a collection of attributes. For example, the systems and methods described herein may generate a signature based on collection of attributes 140. Examples of collections of attributes may include, e.g., a URI parameter and a user agent substring, a URI path substring and an IP address range, an HTTP method and either the presence of URI parameter substring or an IP address within a predetermined range, etc.

In some examples, a signature may be generated based on a browser fingerprint (e.g., information relating to a browser in addition to or apart from what is reported in a user-agent string. For example, the systems and methods described herein may generate a signature based on indicia in network traffic of a browser originating the network traffic. Thus, for examples, these systems and methods may generate a signature based on a browser fingerprint 150 derived from one or more details of an HTTP header, one or more details of a browser window dimension, one or more details an installed browser plug-in, one or more details of JavaScript capabilities of a browser, one or more details of an Application Programming Interface (API) of a browser, and/or one or more details of fonts available to a browser.

In some examples, a signature may be generated based on a device fingerprint (e.g., information relating to a traffic-originating device in addition to or apart from what is reported in a user-agent string. For example, the systems and methods described herein may generate a signature based on indicia in network traffic of a device originating the network traffic. Thus, for examples, these systems and methods may generate a signature based on a device fingerprint 160 derived from one or more details of a device display (e.g., screen resolution, color depth, etc.), one or more details of a time zone with which a device is configured, one or more details of an operating system with which a device is configured, one or more details of hardware (e.g., a central processing unit, a graphics processing unit, memory, etc.) within and/or connected to a device, etc.

In some examples, a signature may be generated based on a method for fingerprinting Secure Socket Layer (SSL)/Transport Layer Security (TLS) clients, such as JA3. For example, the systems and methods described herein may generate a JA3 fingerprint 170 by gathering SSL/TLS client parameters from network packet data and hashing them, the hash being used to identify the specific SSL/TLS client application.

In some examples, a signature may be generated based on a combination of one or more of the above approaches and/or one or more other sources of information. For example, the systems and methods described herein may generate a signature based on a combination 180.

As will be described in greater detail below, the systems and methods described herein may use signatures of any of the types describe above and/or any other suitable signatures for generating new signatures and/or for discovering attacks underlying varying signatures. Additionally or alternatively, in some examples the systems and methods described herein described herein may perform one or more steps described herein only on selected types of signatures. By way of example, these systems and methods may only apply one or more of the steps described herein to browser fingerprint 150, device fingerprint 160, JA3 fingerprint 170, and combination 180.

Figure 2:
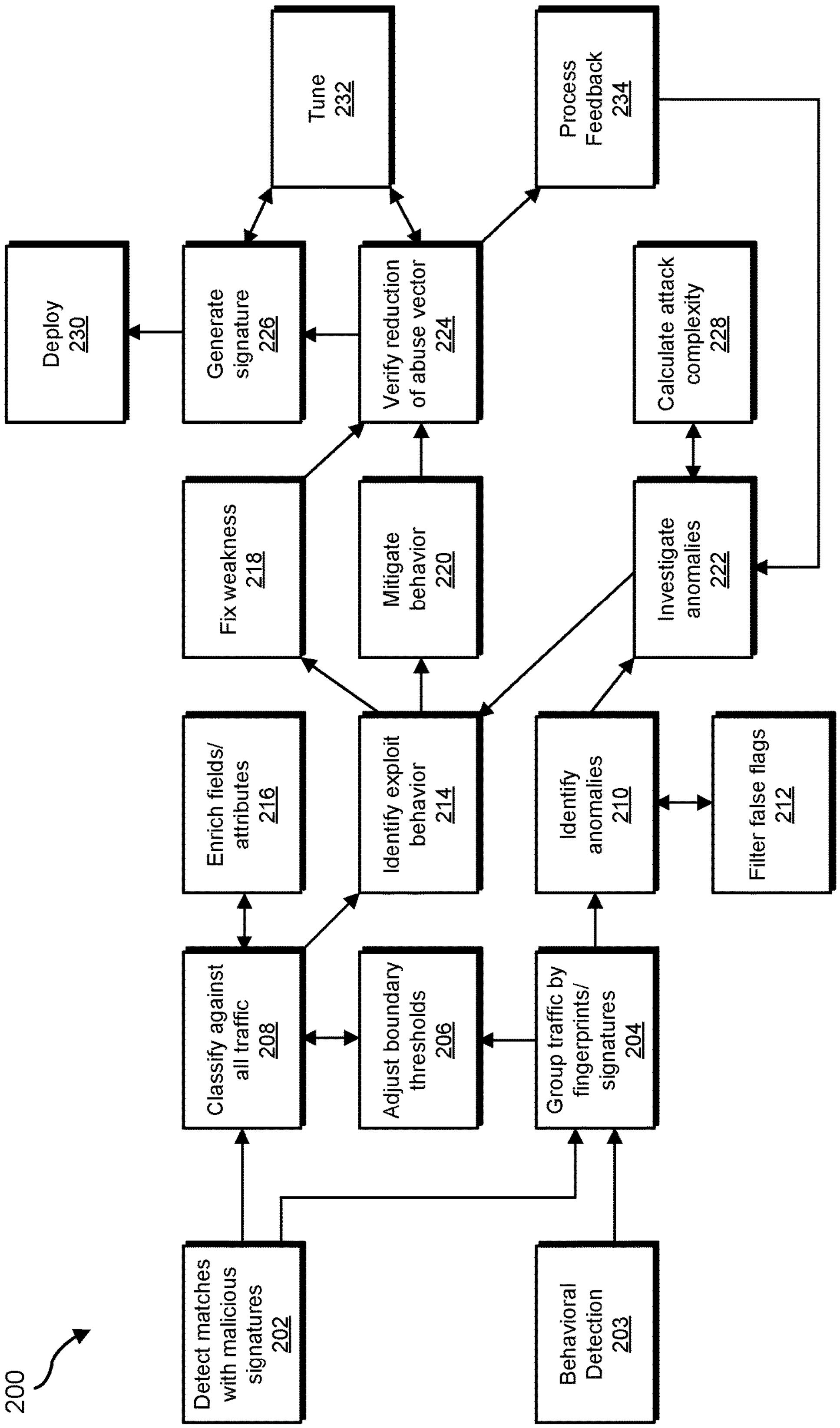
FIG. 2 is a flow diagram for an example process for multi-level fingerprinting.

FIG. 2 is a flow diagram for an example process 200 for multi-level fingerprinting. As shown in FIG. 2, process 200 may begin at a step 202 with detecting matches with malicious signatures. For example, at step 202, the systems and methods described herein may scan network traffic to extract signatures and compare the extracted signatures with known malicious signatures to identify known malicious signatures arising from the network traffic. As sill be explained in greater detail below, before, in addition to, and/or instead of blocking the network traffic associated with the malicious signatures, the systems and methods described herein may perform other steps of process 200.

In addition to detecting known malicious signatures, at step 203 systems and methods described herein may perform behavioral monitoring of network traffic to detect anomalous and/or potentially malicious behavior.

Following step 202 and/or step 203, the systems and methods described herein may proceed to a step 204 by grouping network traffic by signatures (and/or behavioral fingerprints). In some examples, these systems and methods may group some network traffic according to exact signature matches. Additionally or alternatively, these systems and methods may group some network traffic according to approximate signature matches (i.e., potentially different signatures that nevertheless indicate approximately matching features). As may be appreciated, these systems and methods may apply a similarity threshold to determine whether to group approximate signature matches. In some examples, the similarity threshold applied to signatures may depend on the type of signature (with different similarity thresholds applying to different types of signatures). In some examples, the similarity threshold used for a type of signature may depend on the complexity corresponding to the signature (e.g., as described in connection with FIG. 1). Thus, for example, a user-agent string may be lower complexity (e.g., easier to spoof) meaning that the threshold boundaries for grouping together user-agent string signatures may be broader (i.e., less strict).

In some examples, after step 204, the systems and methods described herein may perform a step 206 by adjusting one or more similarity thresholds for grouping together signatures. For example, the systems and methods described herein may determine that the signatures are distributed too sparsely across groups (i.e., that the membership of groups is low), e.g., according to a sparseness metric. Accordingly, in response, the systems and methods described herein may lower a similarity threshold for the type of signature (i.e., requiring less similarity to group signatures together). In some examples, the systems and methods described herein may determine that the signatures are too concentrated within groups (i.e., that the membership of groups is high), e.g., according to a sparseness metric. Accordingly, in response, the systems and methods described herein may raise a similarity threshold for the type of signature (i.e., requiring more similarity to group signatures together).

At a step 208, the systems and methods described herein may classify network traffic corresponding with each group of signatures as against other network traffic (including, e.g., network traffic corresponding with each other group of signatures). In some examples, the systems and methods described herein may use one or more statistical methods and/or machine learning methods to determine patterns in the network traffic differentiating network traffic corresponding to each group of signatures from other network traffic. Thus, for example, these systems and methods may identify a group of features describing network traffic (e.g., in terms of a feature space) and apply one or more statistical and/or machine learning methods to determine relationships between each group of signatures and the features describing network traffic. In some examples, these systems and methods may determine a distance between feature vectors of a group of signatures and other groups of signatures and/or other network traffic as a whole. These systems and methods may then determine whether a group of signatures represents an outlier in the feature space.

In some examples, an originally identified group of features may be insufficient to distinguish one or more of the groups of signatures and/or to set apart one or more of the groups of signatures as an outlier. In these examples, the systems and methods described herein may perform a step 216 to enrich one or more fields and/or attributes of data about the network traffic, thereby adding one or more features to the feature space. For example, these systems and methods may extract additional data relating to the network traffic (e.g., about events related to, causally connected with, and/or coincident with portions of the network traffic) from one or more logs. The systems and methods described herein may then use this additional data to define one or more additional features. With additional features, the systems and methods described herein may perform a statistical analysis and/or machine learning method as described above to identify patterns (e.g., including outliers and/or anomalous patterns) in the network traffic of one or more of the groups of signatures. Furthermore, in some examples, the systems and methods described herein may iterate this process (determining that a pattern has not been found or is inconclusive, ingesting additional data related to existing data about the network traffic, and adding new features and/or properties to the feature space corresponding to the additional ingested data) until a pattern determined to be significant (e.g., in terms of likelihood of indicating malicious behavior and/or in terms of representing an anomaly and/or outlier, as defined by a predetermined threshold or metric) is identified or data sources to ingest are exhausted.

In some examples, at a step 212, the systems and methods described herein may identify one or more instances of false-flag activity. As used herein, the term "false-flag activity" may refer to any computing activity that is not directly a part of a computing attack but which potentially obscures the computing attack. For example, false-flag activity may include activity that has some, but not all, elements of an attack, thereby creating a distraction and/or confusion for security analysts. Thus, for example, a false-flag attack may include benign activity that accompanies malicious activity (e.g., a command-and-control callback to a benign or trusted target accompanying a command-and-control callback to a malicious target). Accordingly, in some examples, the systems and methods described herein may identify false-flag activity by determining that activity with the form of malicious activity (e.g., a command-and-control callback) involves benign content (e.g., a trusted target). Once the systems and methods described herein have identified false-flag activity, these systems and methods may filter the false-flag activity out of network traffic for analysis (e.g., by statistical analysis and/or machine learning methods) as in the steps described above, such that the false-flag activity does not contribute to misleading patterns when analyzing features of each group of signatures.

As noted in FIG. 2 and discussed above, at a step 210 the systems and methods described herein may identify one or more anomalies in patterns of network traffic associated with one or more groups of signatures, and, at a step 222, the systems and methods described herein may investigate the identified anomalies (e.g., analyze network and/or computing environment activity to identify potential attacks associated with the anomalies, including potential attack targets and/or potential methods of attack). Furthermore, at a step 228, the systems and methods described herein may calculate an attack complexity of observed and/or potential attacks relating to the anomalies. These systems and methods may use any method to compute the attack complexity, including any of the methods described earlier. In some examples, the computed attack complexity may be used as input when adjusting boundaries thresholds at step 206.

At a step 214, the systems and methods described herein may identify exploit behavior based at least in part on previously identified anomalous patterns in network traffic. For example, these systems and methods may identify one or more targets of an attack by analyzing the network traffic showing the anomalous pattern. Additionally or alternatively, these systems and methods may identify one or more methods of an attack by analyzing the network traffic showing the anomalous pattern. At a step 218, the systems and methods described herein may repair a computing system weakness. For example, these systems and methods may modify a configuration of a computing environment such that a target of the attack (as identified) is secure against a method of the attack (as identified). For example, these systems and methods may modify one or more security settings, permissions, and/or configurations to protect the target against the attack. In addition or as an alternative to repairing the weakness, these systems and methods may, at a step 220, mitigate malicious behavior. For example, these systems and methods may modify one or more security settings, allocating one or more resources, and/or activate one or more backup systems to mitigate the harm and/or the reach of an attack.

Following steps 218 and/or 220, at a step 224, the systems and methods described herein may verify a reduction of an abuse vector underlying one or more attacks. For example, these systems and methods may verify that attacks have slowed, ceased, and/or become ineffective (e.g., based on results from steps 218 and/or 220). Additionally or alternatively, these systems and methods may simulate one or more instances of an attack based on the abuse vector to confirm that a system weakness has been repaired and/or that effects of attacks based on the abuse vector have been mitigated. In some examples, the systems and methods described herein may, at a step 234, process information about the attempted reduction of the abuse vector and provide the information as feedback to the anomaly investigation process. Thus, for example, aspects of observed network traffic anomalies that continue even after the reduction of the abuse vector may be marked benign, may be investigated as connected to a separate potential abuse vector, and/or may be used to modify one or more processes in steps 218 and 220 to repair a system weakness and/or mitigate potentially malicious behavior.

At a step 226, the systems and methods described herein may generate a new signature that more directly addresses the abuse vector mentioned above and/or that is based on (e.g., configured to detect and/or trigger coincident with) anomalous network traffic patterns associated with a group of signatures as discussed above. As may be appreciated, the new signature may detect attacks based on the abuse vector more consistently than the corresponding group of signatures. For example, while the group of signatures may generally indicate attacks based on the abuse vector, an attacker could vary one or more parameters of 224 the attack (e.g., one or more strings, patterns, attributes, and/or features as shown in pyramid 100 in FIG. 1) to evade existing signatures. In some cases, such variations will create the same pattern of network traffic. Thus, the new signature will detect such existing or future variations, thereby undermining the attacker's efforts. In addition, in some examples, detection of one or more of the group of signatures may suggest, but not strictly indicate, the presence of an attack. Thus, use of the new signature may avoid some false positives.

In some examples, an initial version of the new signature may not fully address an abuse vector. Thus, at a step 232, the systems and methods described herein may tune the new signature to improve detection of attacks based on the abuse vector. For example, as a part of step 232, the systems and methods described herein may iterate one or more of steps 210, 214, 218, 220, 222, and 224 until a suitable network traffic pattern is identified whereby, when the new signature is defined to match the network traffic pattern, the abuse vector is sufficiently addressed.

At a step 230, the systems and methods described herein may deploy the new signature. For example, these systems and methods may start using the new signature in addition to and/or instead of the group of signatures to detect potential attacks and/or malicious network traffic.

Figure 3:
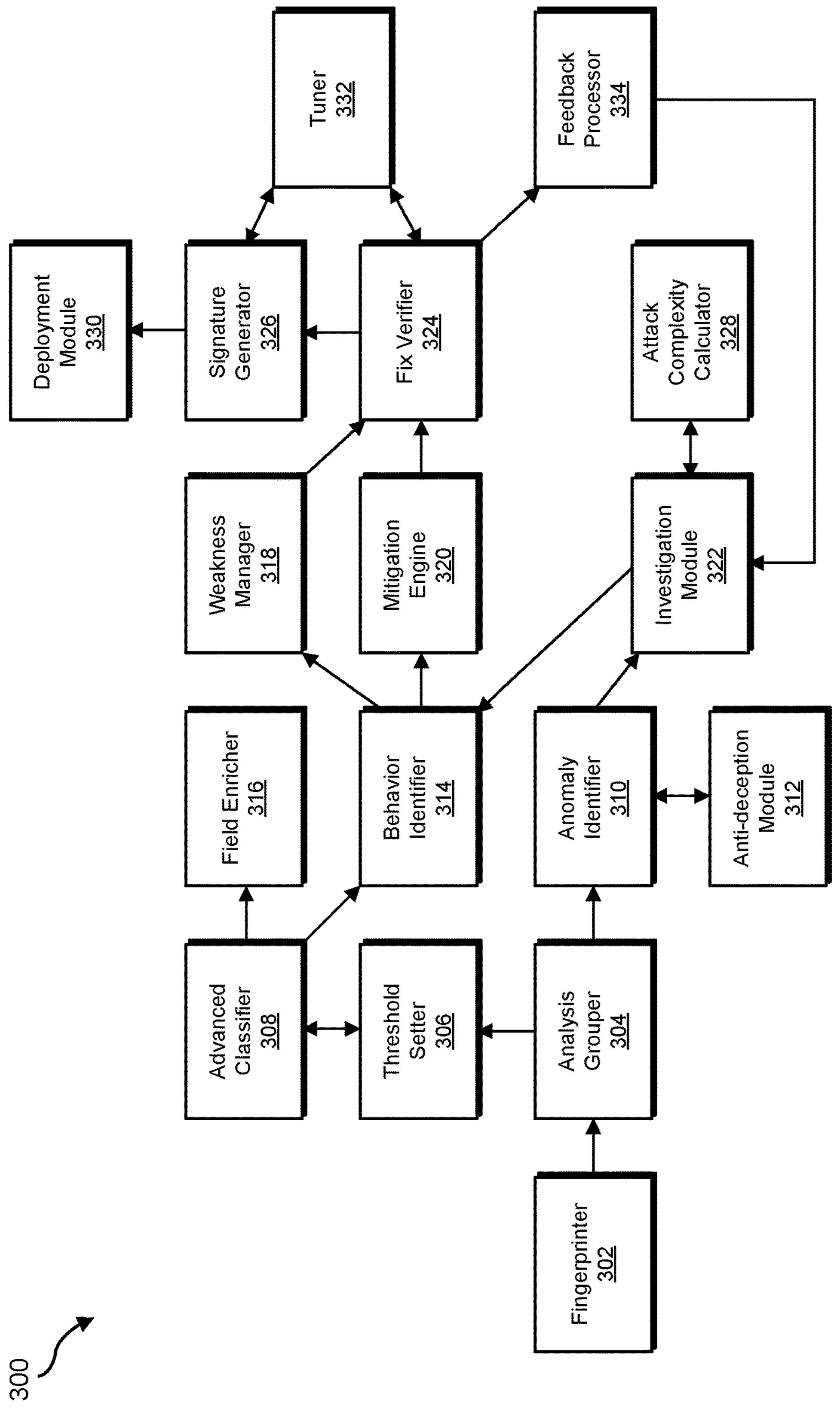
FIG. 3 is block diagram of an example system for multi-level fingerprinting.

FIG. 3 is block diagram of an example system 300 for multi-level fingerprinting. In some examples, system 300 may implement one or more steps illustrated in FIG. 2. The various components and modules of system 300 may be implemented as hardware components and/or software modules that configure hardware components. In some examples, one or more of the components and modules of system 300 may be implemented as a part of a security system (e.g., configured to protect a network from computing attacks).

As shown in FIG. 3, system 300 may include a fingerprinter 302. In some examples, fingerprinter 302 may perform steps 202 and/or 203 of FIG. 2. For example, fingerprinter 302 may intercept network traffic (or receive intercepted network traffic) and extract a fingerprint and/or signature from the network traffic (e.g., based on one or more features, patterns, and/or attributes identified when scanning the network traffic. In addition, in some examples fingerprinter 302 may associate the fingerprint with the network traffic from which the fingerprint originated.

System 300 may also include an analysis grouper 304. In some examples, analysis grouper 304 may perform step 204 in FIG. 2. For example, analysis grouper 304 may group network traffic by fingerprints and/or signatures as identified by fingerprinter 302. In some examples, analysis grouper 304 may group some network traffic according to exact signature matches. Additionally or alternatively, analysis grouper 304 may group some network traffic according to approximate signature matches (i.e., potentially different signatures that nevertheless indicate approximately matching features).

System 300 may also include a threshold setter 306. In some examples, threshold setter 306 may perform step 206 in FIG. 2. For example, threshold setter 306 may set and/or adjust similarity thresholds that determine how similar fingerprints and/or signatures must be to group together their corresponding network traffic. In some examples, threshold setter 306 may set the similarity threshold based at least in part on the type of signature (with different similarity thresholds applying to different types of signatures). In some examples, threshold setter 306 may set the similarity threshold for a type of signature based at least in part on the complexity corresponding to the signature (e.g., as described in connection with FIG. 1). Thus, for example, a user-agent string may be lower complexity (e.g., easier to spoof) meaning that the threshold boundaries for grouping together user-agent string signatures may be broader (i.e., less strict).

System 300 may also include an advanced classifier 308. In some examples, advanced classifier 308 may perform step 208 in FIG. 2. For example, advanced classifier 308 may apply one or more statistical analysis and/or machine learning methods classify the network traffic corresponding to a group of similar fingerprints and/or signatures as against other network traffic, thereby revealing in the network traffic of the group of fingerprints and/or signatures in the aggregate. System 300 may further include a field enricher 316. In some examples, field enricher 316 may perform step 216 in FIG. 2. For example, field enricher 316 may enrich the classification data used by advanced classifier 308 with additional fields and/or attributes (e.g., from system logs recording events relating to the network traffic being analyzed).

System 300 may also include an anomaly identifier 310. In some examples, anomaly identifier 310 may perform step 210 shown in FIG. 2. For example, anomaly identifier 310 may determine whether there are any anomalous patterns and/or outliers in the network traffic for a group of fingerprints and/or signatures. In addition, an anti-deception module 312 may perform step 212 shown in FIG. 2. For example, anti-deception module 312 may filter out false-flag activity from network activity being grouped and analyzed by other modules of system 300. System 300 may further include an investigation module 322. In some examples, investigation module 322 may perform step 222 shown in FIG. 2. For example, investigation module 322 may investigate anomalies identified by anomaly identifier 310.

System 300 may also include an attack complexity calculator 328. In some examples, attack complexity calculator 328 may calculate the complexity of an attack (e.g., uncovered by investigation module 322). For example, complexity calculator 328 may apply a predefined metric to calculate the complexity of the attack, such as the Common Vulnerability Scoring System. Additionally or alternatively, complexity calculator 328 may determine the complexity of the attack based on a ranking of one or more fields, attributes, and/or parameters of network traffic involved in and/or variable within the attack (e.g., such as the ranking illustrated in FIG. 1).

System 300 may also include a behavior identifier 314. In some examples, behavior identifier 314 may identify behavior associated with an exploit (e.g., uncovered by advanced classifier 308 and/or investigation module 322). System 300 may further include a weakness manager 318 and a mitigation engine 320. Weakness manager 318 and mitigation engine 320 may perform steps 218 and 220, respectively, shown in FIG. 2. For example, weakness manager 318 and mitigation engine 320 may repair a system weakness and/or mitigate the effects of malicious behaviors. System 300 may further include a fix verifier 324. In some examples, fix verifier 324 may perform step 224 as shown in FIG. 2. For example, fix verifier 324 may determine whether and the extent to which weakness manager 318 and/or mitigation engine 320 have addressed an underlying security issue. In addition, in some examples, system 300 may include a feedback processor 334. Feedback processor 334 may perform step 234 shown in FIG. 2. For example, feedback processor 334 may provide feedback from fix verifier 324 to investigation module 322.

System 300 may also include a signature generator 326. In some examples, signature generator 326 may perform step 226 shown in FIG. 2. For example, signature generator 326 may generate a new signature that detects malicious behavior that gives rise to a group of fingerprints and/or signatures grouped by analysis grouper 304. In addition, in some examples system 300 may include a tuner 332. In some examples, tuner 332 may perform step 232 shown in FIG. 2. For example, tuner 332 may tune the new signature generated by signature generator 326 to catch additional behavior as determined by fix verifier 324. System 300 may also include a deployment module 330. In some examples, deployment module 330 may perform step 230 as shown in FIG. 2. For example, deployment module 330 may deploy the new signature (e.g., such that one or more security systems in a network and/or computing environment scan activity for the new signature).

Figure 4:
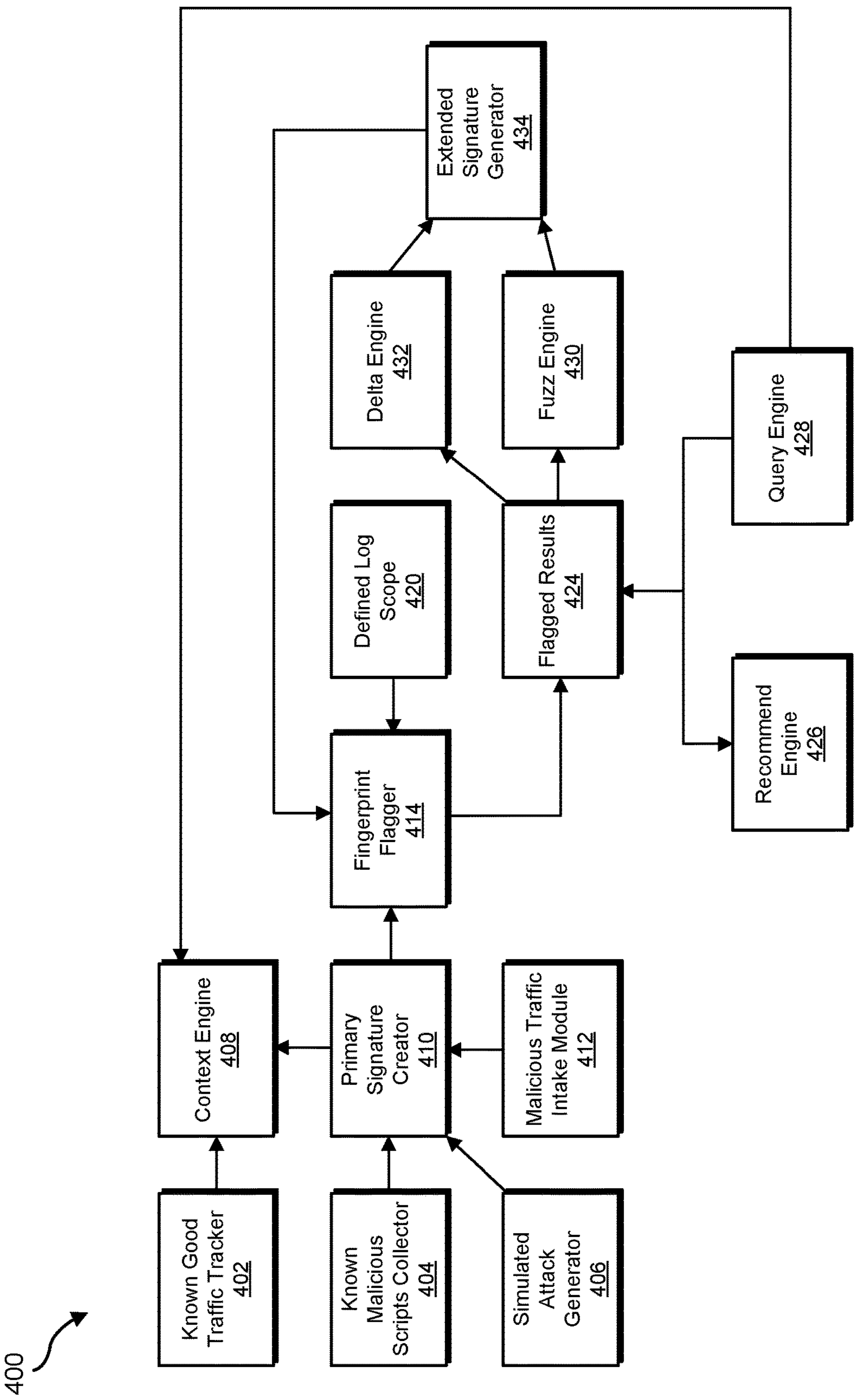
FIG. 4 is a block diagram of another example system for multi-level fingerprinting.

FIG. 4 is a block diagram of an example system 400 for multi-level fingerprinting. As shown in FIG. 4, system 400 may include a known good traffic tracker 402. In some examples, known good traffic tracker 402 may identify network traffic (e.g., within a network environment to be protected) and collect network traffic data determined to represent good network traffic. For example, known good traffic tracker 402 may collect network traffic that has not been flagged as malicious or potentially malicious. Additionally or alternatively, known good traffic tracker 402 may collect network traffic that has affirmatively been flagged as trusted and/or benign (e.g., due to the traffic passing a security check, the traffic being part of an authenticated and/or trusted operation, and/or the traffic having been manually flagged by a security analyst).

In addition, system 400 may include a known malicious script collector 404. In some examples, known malicious script collector 404 may scrape potential sources for known malicious scripts (e.g., security websites, security forums, illegitimate software marketplaces). In some examples, malicious script collector 404 may download relevant malicious scripts. In some examples, malicious script collector 404 may purchase relevant malicious scripts. In some examples, malicious script collector 404 may collect scripts that potentially apply to a specific target network environment. For example, malicious script collector 404 may collect scripts that target one or more hardware and/or software components used within the network environment. Additionally or alternatively, malicious script collector 404 may collect scripts that specifically target the specific target network environment (e.g., scripts that are designed to target a specific corporation's network). In some examples, malicious script collector 404 may collect scripts that target a specific industry.

Furthermore, system 400 may include a simulated attack generator 406. For example, simulated attack generator 406 may execute one or more known attacks against the target network environment (and/or against a simulation of the target network environment). For example, simulated attack generator 406 may execute one or more of the scripts collected by malicious script collector 404 within a simulated environment.

System 400 may also include a primary signature creator 410. Primary signature creator 410 may create one or more signatures based on input from malicious script collector 404 and/or simulated attack generator 406. For example, primary signature creator 410 may extract one or more fingerprints from simulated attacks by simulated attack generator 406. In some examples, to extract the fingerprints from the simulated attacks, primary signature creator 410 may compare traffic generated from the simulated attacks with known good traffic provided by known good traffic tracker 402.

In another example, primary signature creator 410 may create signatures based at least in part on one or more scripts collected by malicious script collector 404. For example, primary signature creator 410 may analyze the content of one or more scripts to identify one or more features that the scripts generate in network traffic. In some examples, primary signature creator 410 may generate a signature based on analyzing the code of a single script. Additionally or alternatively, primary signature creator 410 may generate a signature based on comparing features across similar scripts. In some examples, primary signature creator 410 may create a signature based on both analyzing code from a collected script and analyzing network traffic from a simulated attack. For example, primary signature creator 410 may analyze code from one or more script to search for a source of an observed feature in network traffic from a simulated attack. Additionally or alternatively, primary signature creator 410 may analyze network traffic from a simulated attack to search for the produce of code analyzed from a collected script.

In some examples, system 400 may also include a malicious traffic intake module 412. For example, system 400 and/or one or more associated security systems may collect samples of known malicious traffic (e.g., from sources other than simulated attacks generated by simulated attack generator 406). In some examples, malicious traffic intake module 412 may identify, detect, store, and/or provide samples of known malicious traffic. In some examples, "known" malicious traffic may include traffic that has been flagged as malicious with a specified confidence level and/or using high-fidelity detection rules that are distinguished as providing high-confidence results. Accordingly, primary signature creator 410 may also create one or more signatures based on known malicious traffic provided by malicious traffic intake module 412.

In some examples, system 400 may also include a context engine 408. In some examples, context engine 408 may provide a security context within which a threat vector and/or a component that has been fingerprinted by primary signature creator 410 is captured for reference. The security context may include any of a variety of information, including, without limitation, identifiers of one or more devices within the target network environment targeted by the simulated attack, an importance and/or sensitivity level of one or more devices, applications, and/or data targeted by the simulated attack, and/or, one or more security systems, configurations, parameters, and/or settings active within the target network environment at the time of the simulated attack.

System 400 may also include a fingerprint flagger 414. In some examples, fingerprint flagger 414 may generate and/or set one or more rules and/or policies to generate warnings and/or flags when a signature created by primary signature creator 410 is detected (e.g., at an endpoint related to the type of malicious behavior and/or attack). In some examples, a defined log scope 420 may be provided to fingerprint flagger 414 to define the scope of its operation.

Rules implemented by fingerprint flagger 414 may result in one or more flagged results 424 as signatures created by primary signature creator 410 are detected. In one example, a delta engine 432 may analyze features of known good traffic and traffic from flagged results 424 using one or more statistical and/or machine learning methods to identify distinct features of the flagged traffic. In some examples, system 400 may also include a fuzz engine 430. Fuzz engine 430 may generate functionally identical and/or similar variants of flagged results 424 (e.g., in order to genericize the results). Together, delta engine 432 and fuzz engine 430 may determine the combination of attribute values and/or ranges extractable from network traffic indicative of malicious activity. An extended signature generator 434 may then take the results from delta engine 432 and/or fuzz engine 430 and generate an extended signature. The extended signature may cover not only specific attributes of network traffic found in known malicious scripts, produced in simulated attacks, or observed in past malicious traffic, but also patterns of network traffic observable across individual instances. In some examples, the extended fingerprint may be fed back into fingerprint flagger 414, iterating the process (to, e.g., potentially generate a third-order fingerprint based on flagged results from the (second-order) extended fingerprint.

In some examples, system 400 may include a query engine 428. In some examples, query engine 428 may take queries (e.g., from security analysts) about network traffic and/or logs of network traffic. Thus, for example, a query to query engine 428 with a sample of network traffic may return whether the traffic is malicious. In addition, security analysts may check one or more logs and/or instances of network traffic against context engine 408 to differentiate known-bad activities. Furthermore, security analysts may provide an original malicious log sample (that correlates to a new security incident) into malicious traffic intake module 412 to distinguish between legitimate and malicious activity.

In some examples, system 400 may include a recommendation engine 426. Recommendation engine 426 may recommend one or more mitigations, taking into account available security controls and mechanisms, based on flagged results 424 in context. Examples of mitigations recommended by recommendation engine 426 may include, without limitation, blocking flagged traffic, rejecting a flagged request for a resource (e.g., a targeted resource and/or a sensitive resource), quarantining a resource targeted by and/or potentially to be targeted in an attack, blocking communications from an IP address involved with flagged traffic, and/or reverting a change performed by and/or resulting from flagged traffic.

Figure 5:
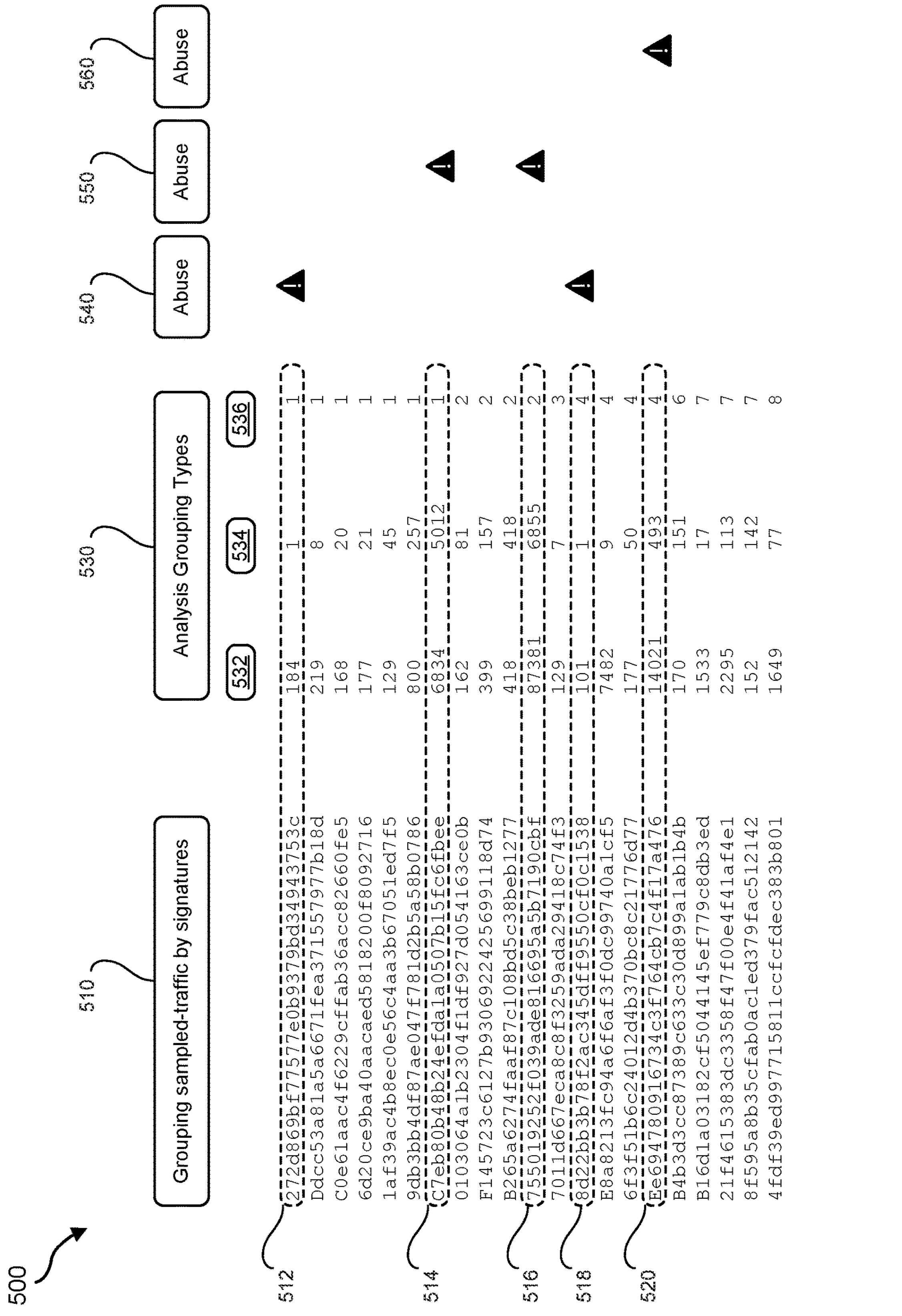
FIG. 5 is an illustration of an example analysis of grouped signatures.

FIG. 5 is an illustration of an example analysis 500 of grouped signatures. As shown in FIG. 5, systems and methods described herein may have performed a grouping 510 of sampled traffic by signatures. In some examples, traffic for a single signature may be grouped together. In other examples, as discussed earlier, traffic for a group of similar signatures (according to a similarity metric which, in turn, may be based at least in part on a complexity of the signature type) may be grouped together. In addition, the systems and methods described herein may analyze grouped traffic according to one or more types 530. For example, these systems and methods may extract a feature 532 from the grouped traffic, as well as a feature 534 and a feature 536.

Having grouped the traffic and extracted features from the grouped traffic, the systems and methods described herein may analyze extracted features 532, 534, and 536 collectively for each grouping of traffic to identify suspicious patterns, anomalous patterns, and/or outlier patterns. For example, systems and methods described herein may identify groupings 512 and 518 as showing anomalous traffic patterns based on the value of feature 534 being very low while feature 532 has a high value. This pattern may be correlated with an abuse 540. In another example, systems and methods described herein may identify groupings 514 and 516 as showing anomalous traffic patterns based on the values of features 534 and 532 being very high. This pattern may be correlated with an abuse 550. In another example, a grouping 520 may show an outlier pattern correlating to an abuse 560.

Figure 6:
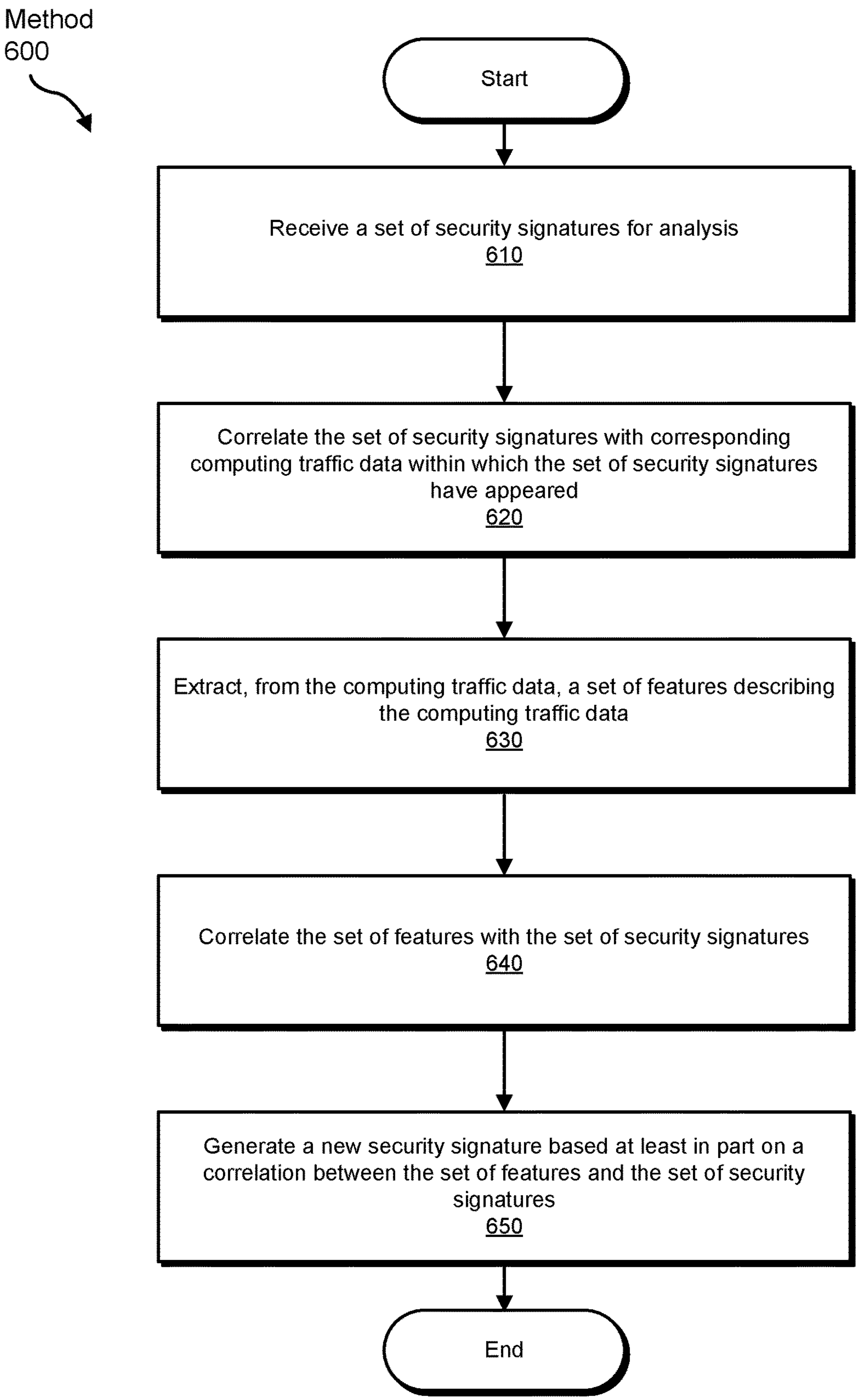
FIG. 6 is a flow diagram of an example method for multi-level fingerprinting.

FIG. 6 is a flow diagram of an example computer-implemented method 600 for multi-level fingerprinting. The steps shown in FIG. 6 may be performed by any suitable computer-executable code and/or computing system, including the system(s) illustrated in FIGS. 3 and 4. In one example, each of the steps shown in FIG. 6 may represent an algorithm whose structure includes and/or is represented by multiple sub-steps.

As illustrated in FIG. 6, at step 610 one or more of the systems described herein may receive a set of security signatures for analysis. These systems may perform step 610 in any of a variety of contexts. For example, these systems may receive the set of security signatures for analysis by identifying the set of security signatures from a security system. For example, the security system may monitor computing traffic and/or communicate with one or more systems that monitor computing traffic and may scan and/or analyze computing traffic by generating one or more signatures that characterize the computing traffic (e.g., that represent content and/or patterns identified within the computing traffic).

The systems described herein may receive (e.g., identify and/or access) the set of security signatures via any suitable method. For example, these systems may periodically evaluate a database of stored security signatures. Additionally or alternatively, these systems may continuously evaluate signatures that have been detected within a network environment (or set of network environments) within a rolling window of time (e.g., the past 15 minutes, the past hour, the past day, the past week, etc.). In some examples, these systems may receive the set of security signatures by manual input. In some examples, these systems may receive the set of security signatures in response to a request to perform a multi-level fingerprinting operation (e.g., by a security analyst).

In addition, in some examples the systems described herein may generate one or more of the set of security signatures (and/or cause one or more of the set of security signatures to be generated) from a malicious program sample. For example, these systems may identify a malicious program sample and may statically analyze the sample to derive one or more signatures that describe and/or indicate content and/or patterns within the sample. Additionally or alternatively, these systems and methods may dynamically analyze the sample (e.g., execute the sample within a controlled environment) to derive one or more signatures that describe and/or indicate content and/or patterns within computing traffic generated by the sample. The malicious program sample may include any suitable sample. In some examples, the malicious program sample may be customized to attack a predefined target. Thus, for example, the systems and methods described herein may select the malicious program sample for use in generating the set of security signatures based at least in part on the malicious program sample being customized to attack a particular target and/or a particular type of target that the systems described herein are configured to protect. Examples of particular targets may include, without limitation, particular computing infrastructures and/or the computing infrastructures of particular organizations. Examples of particular types of targets may include targets that include particular hardware components and/or particular software components.

At step 620, one or more of the systems described herein may correlate the set of security signatures with corresponding computing traffic data within which the set of security signatures have appeared. These systems may correlate the set of security signatures with corresponding computing traffic data in any suitable manner. For example, these systems and may retrieve, from a log and/or report generated by a security system, computing traffic data within which the security system detected each of the set of security signatures. Additionally or alternatively, these systems may log computing traffic data whenever a security signature is detected and associate the logged computing traffic data with the detected security signature.

The computing traffic data may include any of a variety of data. For example, the computing traffic data may include network traffic and/or selected portions of network traffic. Additionally or alternatively, the computing traffic data may include other computing data, such as stored data and/or data being used (e.g., retrieved from storage, manipulated in memory, and/or written to storage). In some examples, the computing traffic data may include observed computing traffic (e.g., not originating from the systems described herein but from external actors). Additionally or alternatively, computing traffic data may include simulated computing traffic (e.g., originating from one or more of the systems described herein and/or associated systems used to simulate traffic). Simulated traffic may be based on any suitable source and/or algorithm. In some examples, systems described herein may simulate traffic similar to previously observed traffic (but, e.g., fuzzed, such that the simulated traffic includes randomized elements and/or some elements deviating from what has previously been observed). In some examples, computing traffic data may include data from computing traffic in a real, live, and/or production computing environment. Additionally or alternatively, computing traffic data may include data from computing traffic in a simulated, sandboxed, and/or virtual environment.

At step 630, one or more of the systems described herein may extract, from the computing traffic data, a set of features describing the computing traffic data. As used here, the term "features" as it relates to computing traffic data may refer to any of a variety of aspects of computing traffic data that may be described, summarized, classified, aggregated, and/or extracted. In some examples, features of computing traffic data may include a source of the computing traffic data (and/or one or more attributes of the source of the computing traffic data), a destination of the computing traffic data (and/or one or more attributes of the destination of the computing traffic data), a timing of the computing traffic data (e.g., time of day, timing relative to one or more other events, and/or frequency of instances of the computing traffic data). In some examples, features of the computing traffic data may relate to aggregated information about the computing traffic data. For example, features of the computing traffic data may relate to a number of instances of a security signature that have been detected in network traffic. As another example, features of the computing traffic data may relate to a number of distinct source addresses have originated computing traffic data within which a given security signature has been detected. As another example, features of the computing traffic may relate to a number of distinct user agents in computing traffic data within which a given security signature has been detected. Thus, some properties of the computing traffic data may appear more often in association with a malicious signature and less often in absence of the malicious signature.

In some examples, the systems described herein may iteratively extract the set of features. For example, these systems may extract an initial subset of features. These systems may then identify a data source that correlates the initial subset of the set of features with an additional subset of features. These systems may then extract the additional subset of features from the data source. These systems may identify the data source for the additional subset of features in any suitable manner. In some examples, these systems may identify one or more logs that link information about the initial subset of features with information about the additional subset of features. For example, the initial subset of features may include data about network traffic with a given user agent that originated traffic triggering one or more instances of a security signature. The additional subset of features may include data that fingerprints a specific device that originated traffic triggering instances of the security signature.

In some examples, the systems described herein may iteratively extract the set of features based at least in part on a predetermined threshold for identifying correlations between the set of security signatures and the set of features. Thus, for example, these systems may iterate in identifying additional features of the computing traffic based at least in part on determining that, given a current version of the set of features, a threshold for distinguishing signatures based on the set of features has not been reached. In some examples, these systems may continue to iterate so long as the correlation using the extracted features fails to reach the predetermined threshold.

At step 640, one or more of the systems described herein may correlate the set of features with the set of security signatures. These systems may correlate the set of security signatures with the set of features in any suitable manner. For example, these systems may implement one or more statistical analysis and/or machine learning methods to identify anomalous patterns and/or outliers to correlate the set of security signatures with the set of features. In some examples, the threshold for correlating the set of features with the set of security signatures (e.g., to determine whether to iterate step 630) may be based on a number and/or proportion of security signatures that are distinguished as anomalous and/or a degree to which the security signatures are distinguished as anomalous based on the set of features. In some examples, these systems may use one or more distance metrics to determine whether a security signature (or group of security signatures) is associated with anomalous computing traffic features.

In some examples, the systems described herein may correlate a security signature with computing traffic features. Additionally or alternatively, as mentioned earlier, in some examples these systems may correlate a group of security signatures with computing traffic features. Thus, for example, these systems may first group similar security signatures within the set of security signatures and then correlate the set of features with one or more groups of similar security signatures. These systems may group similar security signatures based on any suitable criteria. For example, these systems may identify candidate signatures for grouping based on the candidate signatures sharing a signature type (e.g., the signatures being the result of the same operations and/or operations performed on the same fields). Furthermore, these systems may determine the similarity threshold for grouping the candidate signatures may based on the signature type. These systems may use the signature type to determine the similarity threshold in any suitable manner. For example, these systems may look up a similarity threshold assigned to each signature type. Additionally or alternatively, these systems and methods may set, determine, and/or order the similarity threshold for grouping signatures based on an attack complexity associated with the signature type (where an increased complexity corresponds to a higher similarity threshold).

In some examples, these systems may filter and/or normalize computing traffic data used for correlating the set of features with the set of security signatures. For example, these systems may analyze the computing traffic data for a false flag attack and exclude from correlation those portions of the computing traffic data that correspond to the false flag attack. For example, these systems may determine that the computing traffic data includes a command-and-control callback to an untrusted target and that a related operation includes at least one command-and-control callback to a trusted target, potentially indicating a false flag attack.

At step 650, the systems described herein may generate a new security signature based at least in part on a correlation between the set of features and the set of security signatures. In some examples, the new security signature may be based at least in part on the set of features (i.e., those features correlated with a group of security signatures that are outliers with respect to features demonstrated in computing traffic associated with other security signatures).

In some examples, the new security signature may apply to a set of computing traffic scenarios that do not all cause a security system to produce any one of the set of security signatures. For example, applying the set of security signatures may collectively result in at least one false negative that applying the new security signature does not result in. Thus, the new security signature may be able to detect attacks that may otherwise be collectively missed by the set of security signatures. In addition, applying the new security signatures may cause a security system to detect a security threat that corresponds to multiple (e.g., two or more of the set of security signatures). Thus, the new security signature may, in some examples, be useful for more generically identifying attacks as opposed to separately identifying variants of the same attack with different signatures.

Having generated the new security signature, the systems described herein may add the new security signature to a computing security system configured to detect computing threats (e.g., to the same computing security system that previously used the set of security signatures). In some examples, the systems described herein may allow additional system activity originating from the source of a malicious signature from the original set of security signatures and test the new security signature to determine a detection rate of malicious activity by the new security signature. For example, these systems may determine what proportion of network traffic originating from the source (e.g., of a type targeted by the new security signature) that the new security signature successfully detects. Additionally or alternatively, these systems may determine what proportion of attack variants originating from the source that the new security signature successfully detects. In some examples, these systems may deploy the new security signature based partly on determining that the detection rate of the new security signature exceeds a predetermined threshold. For example, the predetermined threshold may be that the new security signature detects 60 percent or more, 70 percent or more, 80 percent or more, 90 percent or more, etc. In some examples, the predetermined threshold may be set by the proportion of variants of the attack detected by the original set of signatures. Thus, if the new security signature detects the same proportion of variants of the attack or more as the original set of signatures, the systems described herein may deploy the new security signature.

Figure 7:
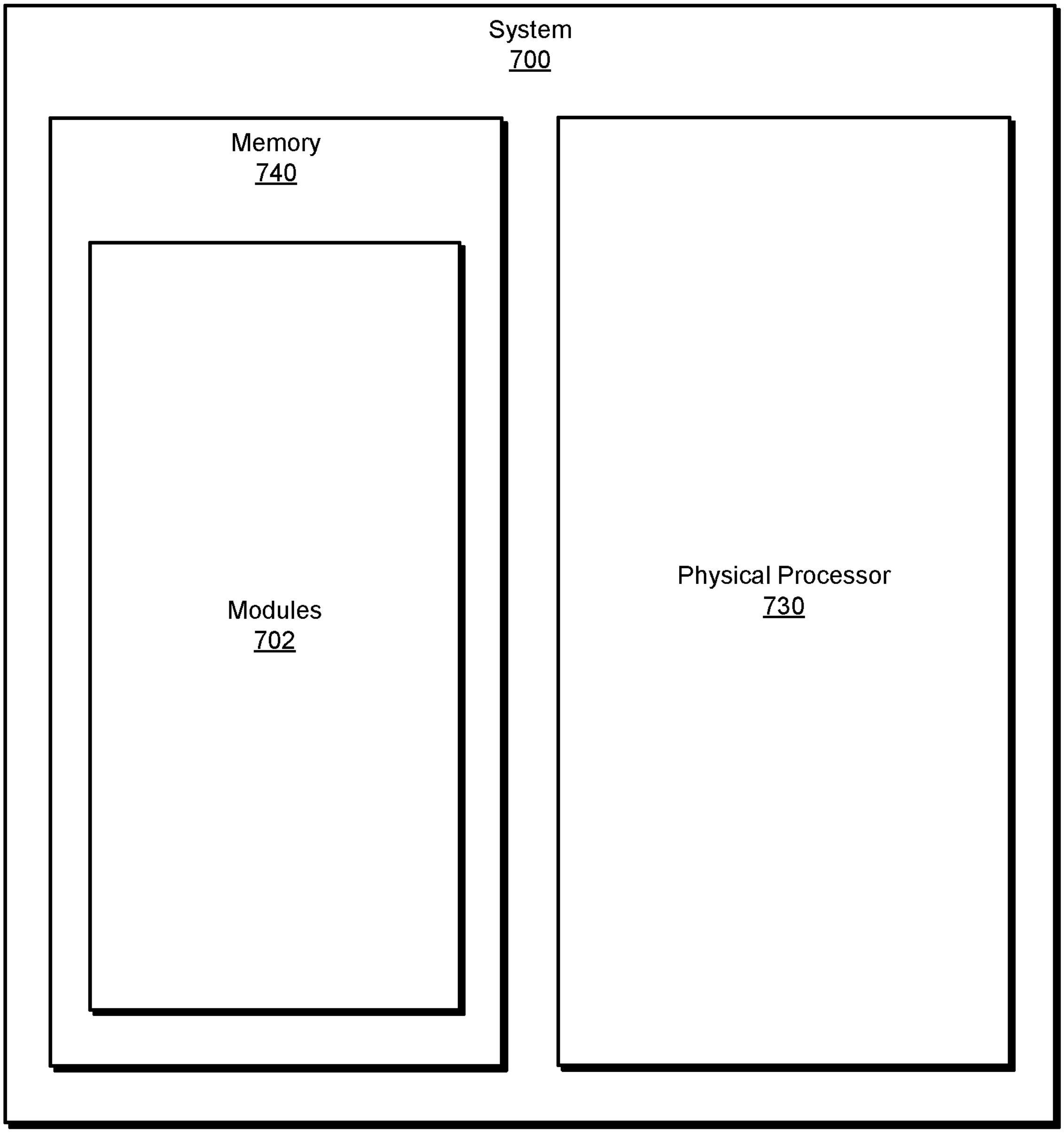
FIG. 7 is a block diagram of an example system for multi-level fingerprinting.

FIG. 7 is a block diagram of an example system for multi-level fingerprinting. As illustrated in this figure, example system 700 can include one or more modules 702 for performing one or more tasks. In some examples, one or more portions of one or more of the steps described herein may be implemented by one or more of modules 702. Although sometimes discussed as separate elements, one or more of modules 702 in FIG. 7 can represent portions of a single module or application.

In certain implementations, one or more of modules 702 in FIG. 7 can represent one or more software applications or programs that, when executed by a computing device, can cause the computing device to perform one or more tasks. For example, and as will be described in greater detail below, one or more of modules 702 can represent modules stored and configured to run on one or more computing devices. One or more of modules 702 in FIG. 7 can also represent all or portions of one or more special-purpose computers and/or special-purpose circuitry configured to perform one or more tasks.

As illustrated in FIG. 7, example system 700 can also include one or more memory devices, such as memory 740. Memory 740 generally represents any type or form of volatile or non-volatile storage device or medium capable of storing data and/or computer-readable instructions. In one example, memory 740 can store, load, and/or maintain one or more of modules 702. Examples of memory 740 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 7, example system 700 can also include one or more physical processors, such as physical processor 730. Physical processor 730 generally represents any type or form of hardware-implemented processing unit capable of interpreting and/or executing computer-readable instructions. In one example, physical processor 730 can access and/or modify one or more of modules 702 stored in memory 740. Additionally or alternatively, physical processor 730 can execute one or more of modules 702 to facilitate deep learning for discontinuous data. Examples of physical processor 730 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Many other devices or subsystems can be connected to system 700 in FIG. 7. Conversely, all of the components and devices illustrated in FIG. 7 need not be present to practice the implementations described and/or illustrated herein. The devices and subsystems referenced above can also be interconnected in different ways from those described above. System 700 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium. In some examples, one or more of modules 702 may be implemented in whole or in part as integrated circuits.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

receiving, by a computing system, a set of security signatures for analysis;

identifying, by the computing system, computing traffic data within which the set of security signatures have appeared;

extracting, by the computing system and from the computing traffic data, a set of features describing the computing traffic data;

grouping, by the computing system, similar security signatures of the set of security signatures;

classifying, by the computing system using at least one of a statistical or machine learning analysis, the set of features to one or more groups of similar security signatures;

generating, by the computing system, a new security signature based at least in part on the one or more groups of similar security to detect security threats associated with the one or more groups;

detecting, by the computing system, a security threat underlying the new security signature; and blocking, by the computing system, computing traffic data associated with the security threat.

2. The computer-implemented method of claim 1, wherein the new security signature applies to a set of computing traffic scenarios that do not all cause a security system to produce any one of the set of security signatures.

3. The computer-implemented method of claim 1, wherein the new security signature, when applied by a security system, causes the security system to detect a security threat underlying at least two of the security signatures within the set of security signatures.

4. The computer-implemented method of claim 1, further comprising adding, by the computing system, the new security signature to a computing security system configured to detect computing threats.

5. The computer-implemented method of claim 1, wherein grouping similar security signatures comprises:

identifying candidate signatures for grouping based on the candidate signatures sharing a signature type; and determining a similarity threshold for grouping the candidate signatures based on the signature type.

6. The computer-implemented method of claim 5, wherein determining the similarity threshold for grouping the candidate signatures based on the signature type comprises determining the similarity threshold for grouping the candidate signatures based at least in part on a complexity of an attack associated with the signature type, wherein an increased complexity correlates with a higher similarity threshold.

7. The computer-implemented method of claim 1, wherein correlating the set of features with the set of security signatures comprises:

analyzing the computing traffic data for a false flag attack; and excluding from correlation portions of the computing traffic data corresponding to the false flag attack.

8. The computer-implemented method of claim 7, wherein analyzing the computing traffic data for the false flag attack comprises determining that an operation within the computing traffic data comprises at least one command-and-control callback to an untrusted target and that a related operation comprises at least one command-and-control callback to a trusted target.

9. The computer-implemented method of claim 1, wherein extracting the set of features comprises:

extracting a first subset of the set of features;

identifying a data source correlating the first subset of the set of features with a second subset of the set of features; and extracting the second subset of the set of features from the data source.

10. The computer-implemented method of claim 9, wherein identifying the data source correlating the first subset of the set of features with the second subset of the set of features is in response to determining that the first subset of the set of features fails to reach a predetermined threshold for correlating with the set of security signatures to generate the new security signature.

11. The computer-implemented method of claim 1, wherein receiving the set of security signatures for analysis comprises identifying the set of security signatures from a security system analyzing the computing traffic data.

12. The computer-implemented method of claim 1, wherein receiving the set of security signatures for analysis comprises generating the set of security signatures from at least one malicious program sample.

13. The computer-implemented method of claim 12, wherein the at least one malicious program sample is customized to attack a predefined target.

14. The computer-implemented method of claim 1, wherein the computing traffic data comprises:

data from observed computing traffic; and data from simulated computing traffic.

15. The computer-implemented method of claim 14, further comprising generating the simulated computing traffic data using a fuzzing process to produce variants of the computing traffic data, wherein classifying the set of features includes classifying features from observed and simulated computing traffic data.

16. A system comprising:

a processor; and a memory having stored thereon instructions that are executable by the processor to cause the system to perform operations comprising:

intercepting network traffic;

generating a plurality of signatures from the network traffic;

recording features of the network traffic associated with each of the plurality of signatures;

creating one or more groupings of the plurality of signatures based at least in part on a similarity of data used for each of the plurality of signatures, wherein creating the one or more groupings includes using at least one of a statistical analysis or a machine learning classification to identify anomalous patterns in the network traffic, wherein the at least one of a statistical analysis or a machine learning classification is applied to the features to identify anomalous patterns in the network traffic that differentiate traffic corresponding to each group from other traffic;

generating a new signature based on the recorded features of the network traffic in response to the recorded features of the network traffic correlating with at least one of the one or more groupings of the plurality of signatures;

deploying the new signature to a security system for comparison against future network traffic; and causing the security system to block network traffic corresponding to the new signature.

17. The system of claim 16, wherein the new signature, when applied by a security system, causes the security system to detect a type of attack from which signatures within at least one of the one or more groupings of the plurality of signatures were derived.

18. The system of claim 17, wherein the security system detects the type of attack using the new signature when the type of attack does not include any of the plurality of signatures.

19. A computer-implemented method comprising:

scanning, by a computing system, system activity of a plurality of sources for any of a plurality of malicious signatures;

detecting, by the computing system, at least one malicious signature of the plurality of malicious signatures within the system activity of a source of the plurality of sources;

analyzing, by the computing system, the system activity of the source for one or more properties that appear in conjunction with the at least one malicious signature but that do not appear as often in absence of the at least one malicious signature;

generating, by the computing system, a new malicious signature based on the one or more properties that appear in conjunction with the at least one malicious signature;

allowing, by the computing system, additional system activity originating from the source of the at least one malicious signature and testing the new malicious signature to determine a detection rate of malicious activity within the additional system activity by the new malicious signature, wherein the detection rate comprises a proportion of attack variants originating from the source that the new malicious signature successfully detects;

deploying, by the computing system, the new malicious signature for use by a security system based at least in part on determining that the detection rate by the new malicious signature exceeds a predetermined threshold; and causing the security system to block system activity corresponding to the new malicious signature.

* * * * *